United States Patent
Matsumoto et al.

(10) Patent No.: US 8,619,515 B1
(45) Date of Patent: Dec. 31, 2013

(54) THERMALLY-ASSISTED RECORDING (TAR) HEAD WITH REFLECTION LAYER FOR NEAR-FIELD TRANSDUCER

(75) Inventors: Takuya Matsumoto, Sunnyvale, CA (US); Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/571,432

(22) Filed: Aug. 10, 2012

(51) Int. Cl.
*G11B 11/00* (2006.01)
(52) U.S. Cl.
USPC .......................................... 369/13.33
(58) Field of Classification Search
USPC ................... 369/13.02, 13.13, 13.32, 13.33
See application file for complete search history.

(56) References Cited

U.S. PATENT DOCUMENTS

| | | | |
|---|---|---|---|
| 6,649,894 B2 | 11/2003 | Matsumoto et al. | |
| 6,768,556 B1 | 7/2004 | Matsumoto et al. | |
| 7,151,738 B2 * | 12/2006 | Peng ........................ | 369/112.27 |
| 7,272,079 B2 | 9/2007 | Challener | |
| 7,969,826 B2 | 6/2011 | Naniwa et al. | |
| 8,139,447 B2 | 3/2012 | Sasaki et al. | |
| 2004/0085862 A1 | 5/2004 | Matsumoto et al. | |
| 2011/0096639 A1 | 4/2011 | Matsumoto | |
| 2011/0170381 A1 | 7/2011 | Matsumoto | |
| 2011/0235480 A1 | 9/2011 | Goulakov et al. | |

OTHER PUBLICATIONS

"Near-field light assisted magnetic recording head for ultra-high recording capacity", Seiko Instruments, Inc., published (undated) on the web at: http://www.sii.co.jp/info/eg/nfos1.html.
Ikkawi et al., "Near-Field Optical Transducer for Heat-Assisted Magnetic Recording for Beyond-10-Tbit/in2 Densities", J. Nanoelectron. Optoelectron. 2008, vol. 3, No. 1, pp. 44-54.

* cited by examiner

*Primary Examiner* — Brenda Bernardi
(74) *Attorney, Agent, or Firm* — Thomas R. Berthold (57) ABSTRACT

A thermally-assisted recording (TAR) head for recording data in data tracks of a TAR disk is supported on an air-bearing slider and includes a near-field transducer (NFT) and an optical waveguide that directs laser light to the NFT. The NFT has an output end at the slider's air-bearing surface (ABS) located between the write pole and the optical waveguide in the along-the-track direction. A reflection layer is located on the side of the waveguide opposite the NFT. The scattered light propagated by the waveguide is reflected back by the reflection layer to the NFT. When the distance between the reflection layer and the center of the NFT in the along-the-track direction is adjusted so the phase of the reflected light matches the phase of the plasma oscillation in the NFT, the intensity of the optical near-field is increased. This allows for a reduction in laser power.

21 Claims, 8 Drawing Sheets

THERMALLY-ASSISTED RECORDING (TAR) HEAD WITH REFLECTION LAYER FOR NEAR-FIELD TRANSDUCER

TECHNICAL FIELD

This invention relates generally to a thermally-assisted recording (TAR) disk drive, in which data are written while the magnetic recording layer on the disk is at an elevated temperature, and more specifically to an improved TAR head.

BACKGROUND OF THE INVENTION

In conventional magnetic recording, thermal instabilities of the stored magnetization in the recording media can cause loss of recorded data. To avoid this, media with high magnetocrystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is thermally-assisted recording (TAR), also called heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed TAR systems, the magnetic recording material is heated to near or above its Curie temperature. The recorded data is then read back at ambient temperature by a conventional magnetoresistive read head. TAR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed TAR disk drive uses a laser source and an optical waveguide coupled to a near-field transducer (NFT) for heating the recording material on the disk. A "near-field" transducer refers to "near-field optics", wherein the passage of light is through an element with subwavelength features and the light is coupled to a second element, such as a substrate like a magnetic recording medium, located a sub-wavelength distance from the first element. The NFT is typically located at the air-bearing surface (ABS) of the air-bearing slider that also supports the read/write head and rides or "files" above the disk surface.

A NFT with a generally triangular output end is described in US published applications 20110096639 and 20110170381, both assigned to the same assignee as this application. In this NFT an evanescent wave generated at a surface of the waveguide couples to surface plasmons excited on the surface of the NFT 74 and a strong optical near-field is generated at the apex of the triangular output end.

What is needed is a TAR head with improved efficiency of the NFT so as to reduce the required laser power.

SUMMARY OF THE INVENTION

The invention relates to a thermally-assisted recording (TAR) head for recording data in data tracks of a TAR disk. An air-bearing slider supports a near-field transducer (NFT) and an optical waveguide that directs laser light to the NFT. The NFT has an output end at the slider's air-bearing surface (ABS) located between the write pole and the optical waveguide in the along-the-track direction. A reflection layer is located on the side of the waveguide opposite the NFT. The scattered light propagated by the waveguide is reflected back by the reflection layer to the NFT. When the distance between the reflection layer and the center of the NFT in the along-the-track direction is adjusted so the phase of the reflected light matches the phase of the plasma oscillation in the NFT, the intensity of the optical near-field is increased. This allows for a reduction in laser power. This optimum distance is between $0.8N*\lambda/(2n)$ and $1.2N*\lambda/(2n)$, where N is an integer, $\lambda$ is the wavelength of the laser light and n is the average of the indices of refraction of the waveguide and the intermediate insulating material.

For a fuller understanding of the nature and advantages of the present invention, reference should be made to the following detailed description taken together with the accompanying figures.

DETAILED DESCRIPTION OF THE INVENTION

Figure 1:
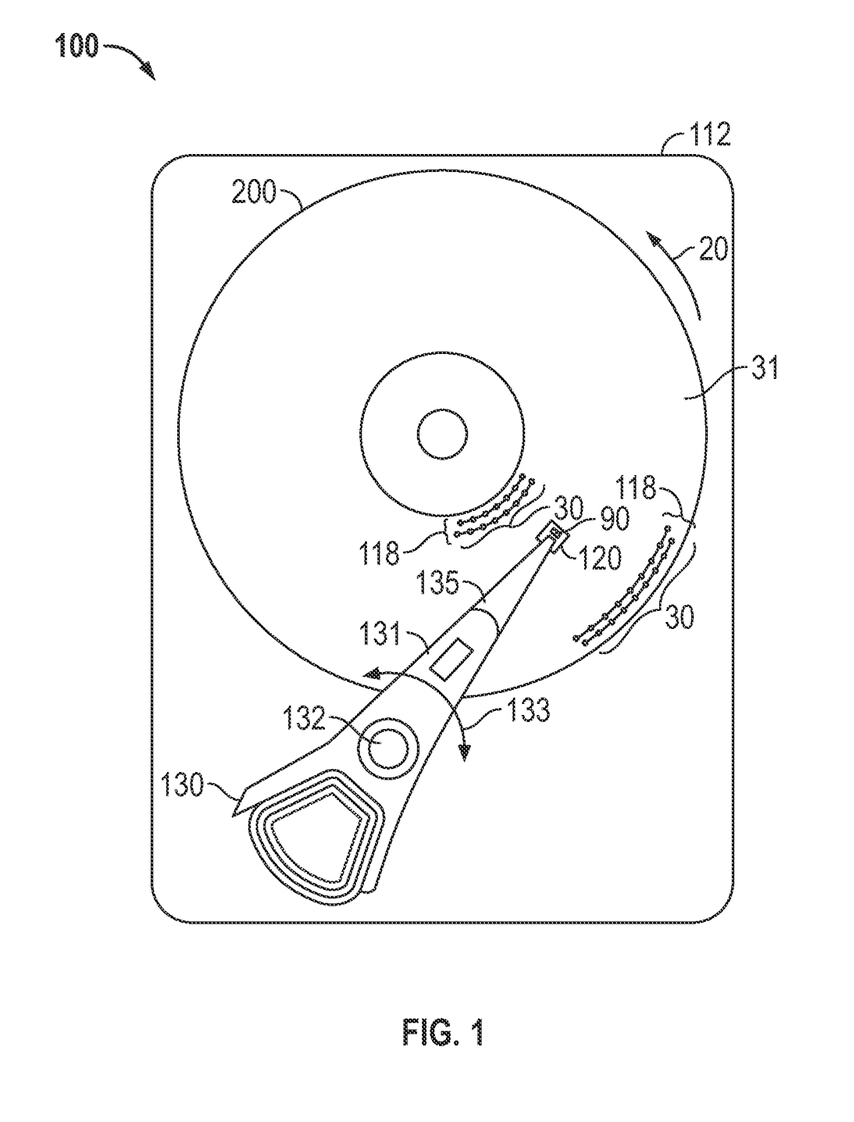
FIG. 1 is a top view of a thermally-assisted recording (TAR) disk drive according to the invention.

FIG. 1 is a top view of a thermally-assisted recording (TAR) disk drive 100 according to the invention. In FIG. 1, the TAR disk drive 100 is depicted with a disk 200 with magnetic the recording layer 31 patterned into discrete data islands 30 of magnetizable material arranged in radially-spaced circular tracks 118. Only a few representative islands 30 and representative tracks 118 near the inner and outer diameters of disk 200 are shown. However, instead of the bit-patterned-media (BPM) shown with discrete data islands 30 in FIG. 1, the TAR disk drive may instead use disks in which the recording layer 31 is a conventional continuous magnetic recording layer of magnetizable material.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 200 and enables it to "pitch" and "roll" on the air-bearing generated by the disk 200 as it rotates in the direction of arrow 20. The slider 120 supports the TAR head (not shown), which includes a magnetoresistive read head, an inductive write head, the near-field transducer (NFT) and optical waveguide. A semiconductor laser 90 with a wavelength of 780 to 980 nm may used as the TAR light source and is depicted as being supported on the top of slider 120. Alternatively the laser may be located on suspension 135 and coupled to slider 120 by an optical channel. As the disk 200 rotates in the direction of arrow 20, the movement of actuator 130 allows the TAR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and TAR head associated with each surface of each disk.

Figure 2:
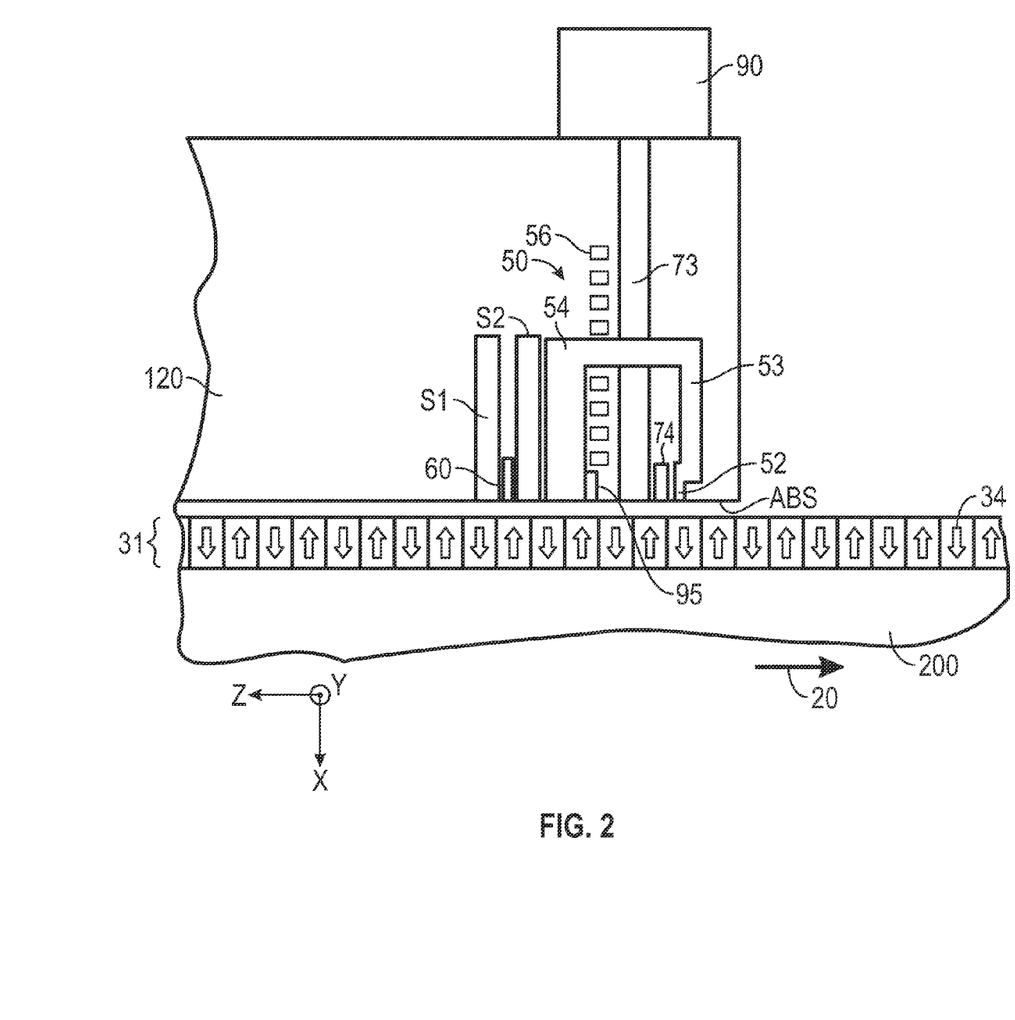
FIG. 2 depicts a sectional view, not drawn to scale because of the difficulty in showing the very small features, of an air-bearing slider for use in TAR disk drive and a portion of a TAR disk according to the invention.

In the following drawings, the X direction denotes a direction perpendicular to the air-bearing surface (ABS) of the slider, the Y direction denotes a track width or cross-track direction, and the Z direction denotes an along-the-track direction. FIG. 2 is a schematic cross-sectional view illustrating a configuration example of a TAR head according to the present invention. In FIG. 2, the disk 200 is depicted with the recording layer 31 being a conventional continuous magnetic recording layer of magnetizable material with magnetized regions or "bits" 34. The air-bearing slider 120 is supported by suspension 135 and has an ABS that faces the disk 200 and supports the magnetic write head 50, read head 60, and magnetically permeable read head shields S1 and S2. A recording magnetic field is generated by the write head 50 made up of a coil 56, a magnetic pole 53 for transmitting flux generated by the coil 56, a main pole 52, and a return pole 54. A magnetic field generated by the coil 56 is transmitted through the magnetic pole 53 to the main pole 52 arranged in a vicinity of an optical near-field transducer (NFT) 74. At the moment of recording, the recording layer 31 of disk 200 is heated by an optical near-field generated by the NFT 74 and, at the same time, a region or "bit" 34 is magnetized and thus written onto the recording layer 31 by applying a recording magnetic field generated by the main pole 52. The disk 200 may optionally include a soft magnetically permeable underlayer (SUL) below the recording layer 31 for directing the magnetic flux from the write pole 52 to the return pole 54.

When the optical near-field is generated by the NFT 74, scattered light is also generated from the NFT 74. A reflection layer 95 is located on the side of waveguide 73 opposite the NFT 74. The scattered light propagated by waveguide 73 is reflected back by the reflection layer 95 to the NFT 74. When the distance between the reflection layer 95 and the NFT 74 in the along-the-track direction (Z-axis) is adjusted so the phase of the reflected light matches the phase of the plasma oscillation in the NFT 74, the intensity of the optical near-field is increased. This allows for a reduction in laser power.

A semiconductor laser 90 is mounted to the top surface of slider 120. An optical waveguide 73 for guiding light from laser 90 to the NFT 74 is formed inside the slider 120. Materials that ensure a refractive index of the waveguide 73 core material to be greater than a refractive index of the cladding material may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $SiO_xN_y$, or Ge-doped $SiO_2$ as the core material. The waveguide 73 that delivers light to NFT 74 is preferably a single-mode waveguide. A multi-mode waveguide is not preferred because it may cause power fluctuations due to intermode interference.

Figure 3A:
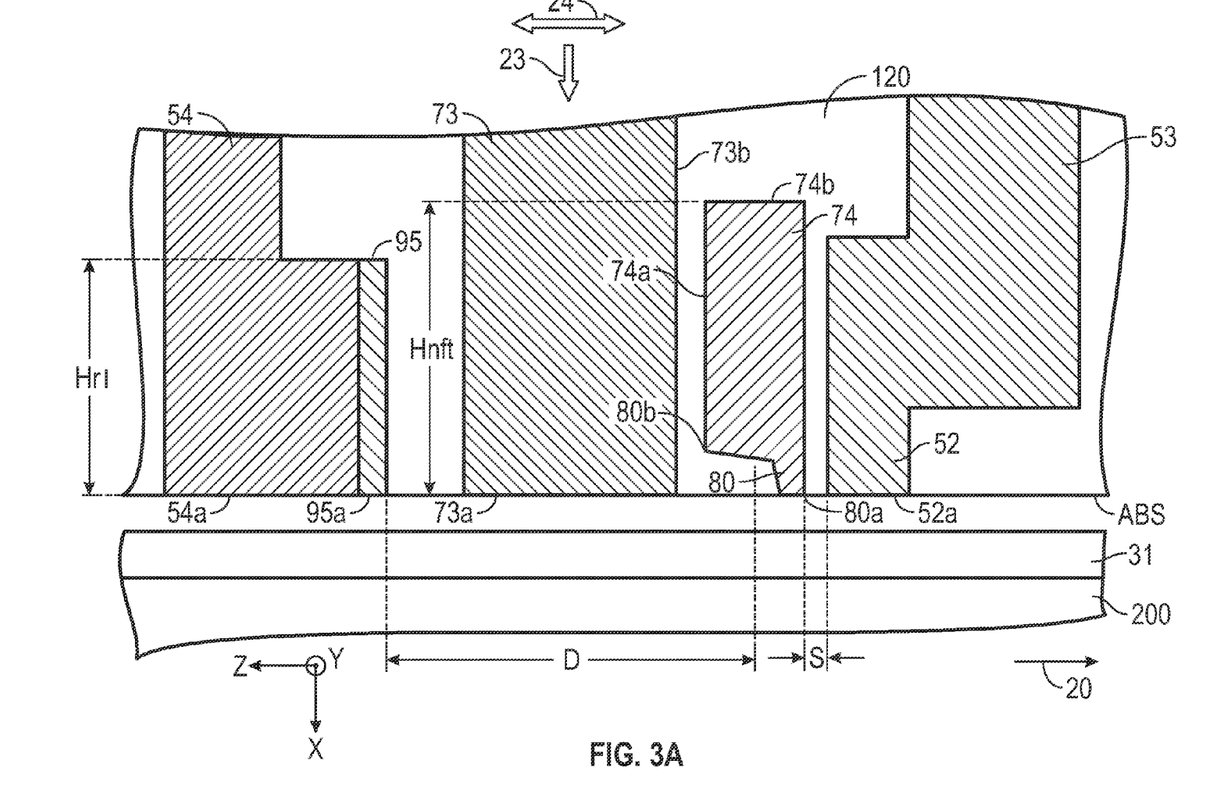
FIG. 3A is a side sectional view of the slider showing the layers of material making up the write pole, the near-field transducer (NFT), the waveguide, the reflection layer and the return pole in the TAR head according to the invention.

FIG. 3A is a side sectional view of the slider 120 showing the layers of material making up the write pole 52, the NFT 74, waveguide 73, reflection layer 95 and return pole 54 and shown in relation to disk 200 with recording layer 31. In FIG. 3A, the unshaded regions of slider 120 are typically formed of insulating material like alumina ($Al_2O_3$). The write pole 52 is typically a layer of high-moment material like FeCo and has a pole tip 52a at the ABS. The waveguide 73 is a layer of core material generally parallel to the write pole 52 layer with a length orthogonal to the ABS, an end 73a at the ABS and a generally planar surface 73b that faces and is parallel to the layer of material making up NFT 74. The NFT 74 layer is a conductive low-loss metal (preferably Au, but also Ag, Al or Cu), is generally parallel to waveguide 73 layer and write pole 52 layer, and is located between and spaced from the waveguide 73 layer and the write pole 52 layer. The NFT 74 layer has a surface 74a that faces, is parallel to and spaced from waveguide surface 73b. The NFT 74 layer has an output end 80 at the ABS and height $H_{nft}$ from the ABS to an input edge 74b recessed from the ABS. When light is introduced into the waveguide 73, an evanescent wave is generated at the waveguide surface 73b and couples to a surface plasmon excited on the surface 74a of NFT 74. Arrow 23 shows the direction of propagation of light in waveguide 73 and arrow 24 shows the direction of polarization of the light. The surface plasmon propagates to the NFT output end 80.

In one type of NFT the output end 80 is a generally triangularly shaped antenna with an apex 80a that faces the write pole tip 52a and a back edge 80b that faces the waveguide surface 73b. At the apex 80a an optical near-field spot is generated in the space at the ABS between the output end apex 80a and the write pole tip 52a. The write pole tip 52a applies a magnetic field at the optical spot. In one example, the distance S between the apex 80a and the write pole tip 52a is about 20 nm.

As shown in FIG. 3A, the reflection layer 95 is formed on return pole 54. However, the reflection layer 95 may be separate from the return pole 54, for example alumina may be located between the return pole 54 and the reflection layer 95. The reflection layer 95 is a metal or metal alloy, for example one or more of Cu, Ag, Au, Al, Rh, Ti, Cr, Mo, Fe, Co and Ni. The reflection layer 95 may also be a multilayer of dielectric materials with different refractive indices. If the disk includes a SUL the along-the-track distance between the write pole 52 and the return pole 54 must be small enough to generate a high magnetic field, so the reflection layer 95 may have a thickness in the along-the-track direction (the Z axis) of between about 30 and 100 nm. If the disk does not include a SUL, the thickness of the reflection layer 95 may be larger, for example up to about 200 nm. The reflection layer 95 has a height $H_{rl}$ in a direction orthogonal to the ABS (the X axis), which is preferably less than $R_{nft}$. The distance D between the reflection layer 95 and the center of the thickness of the NFT 74 in the along-the-track direction (Z-axis) is adjusted so the phase of the reflected light matches the phase of the plasma oscillation in the NFT 74, the intensity of the optical near-field is increased. The optimum distance for D is $N*\lambda/(2n)$, where N is an integer (1, 2, 3, 4 . . . ), $\lambda$ is the wavelength of the laser light and n is the average of the indices of refraction of the material between the reflection layer 95 and the NFT 74, i.e., the material of waveguide 73 and the insulating material (typically alumina).

Figure 3B:
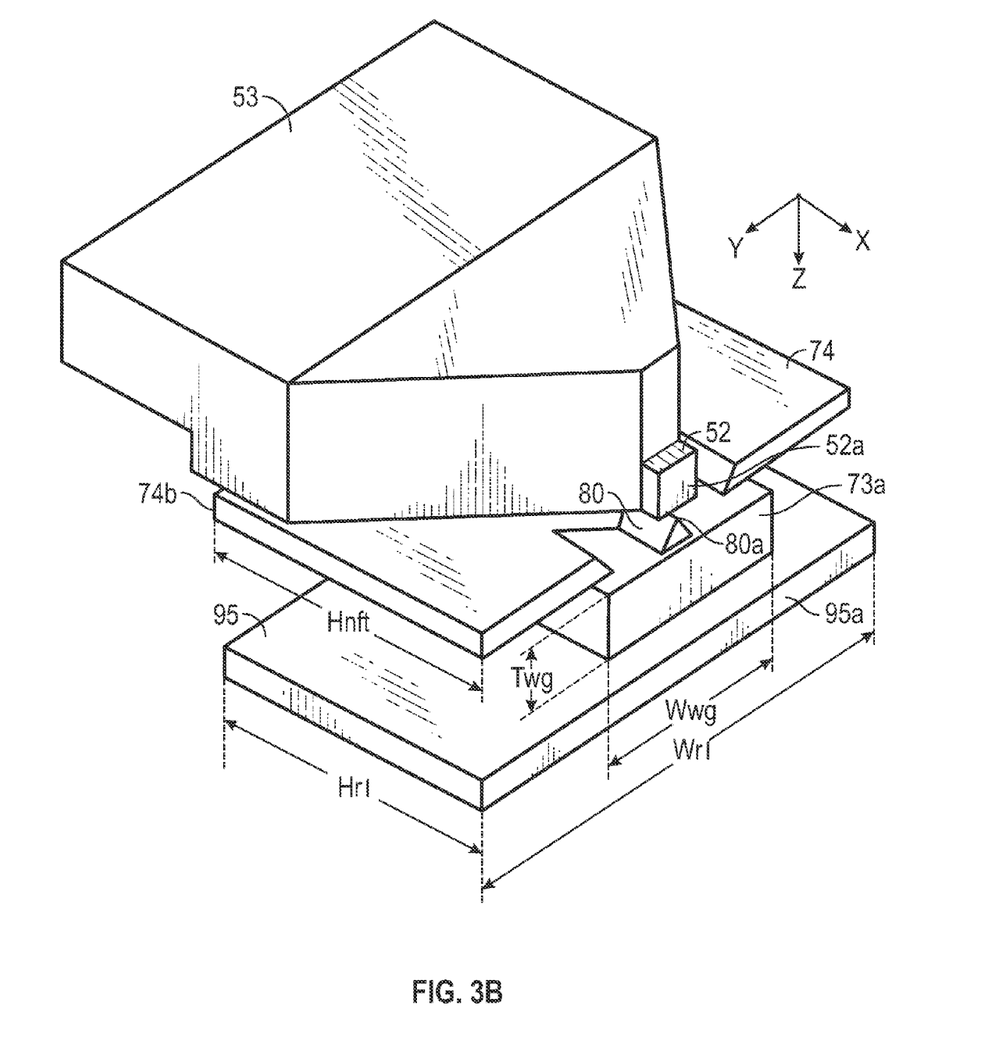
FIG. 3B is a perspective view of the layers of material making up the write pole, the NFT, the waveguide and the reflection layer according to the invention.
Figure 3C:
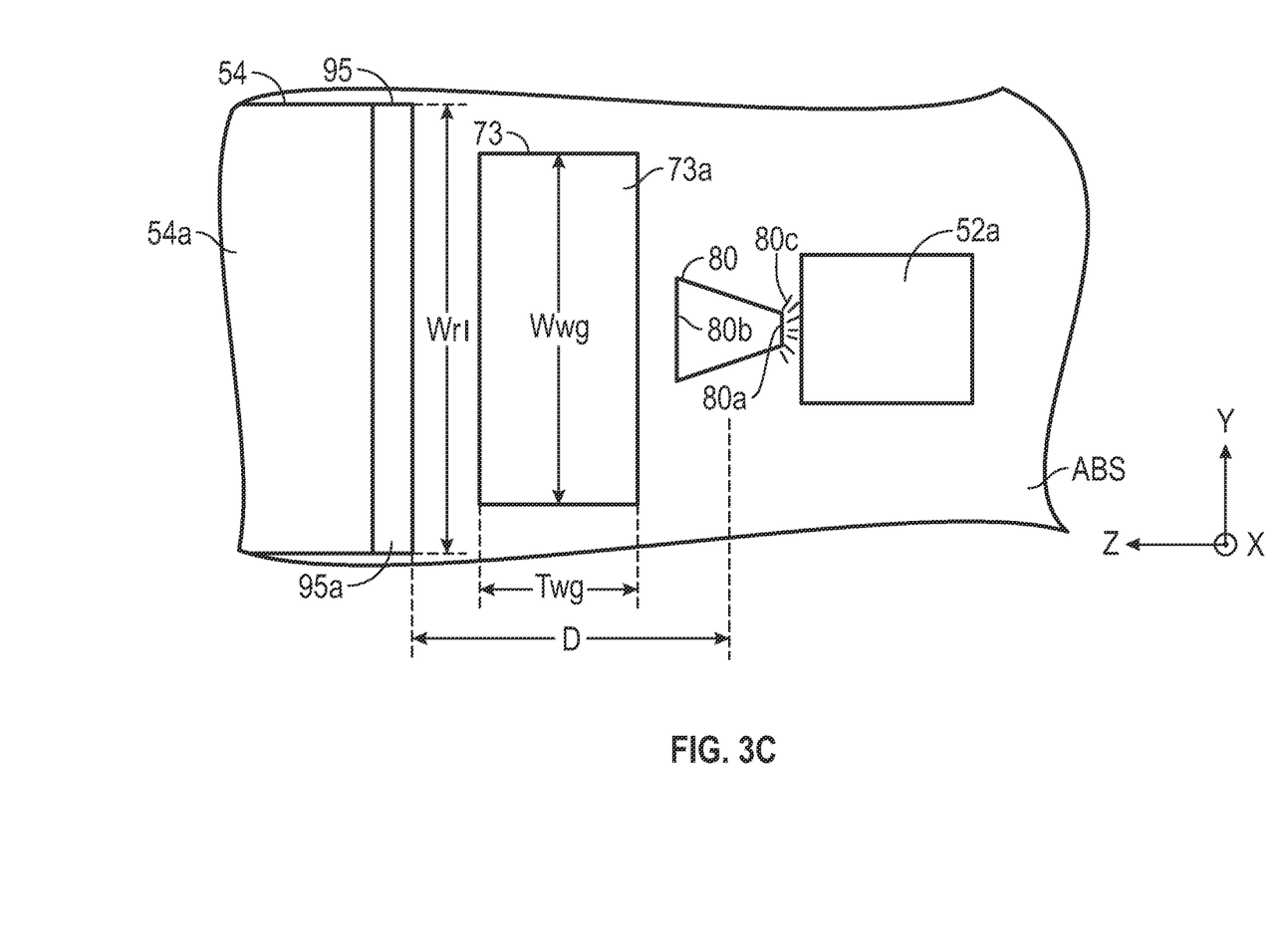
FIG. 3C is a view of a portion of the slider air-bearing surface (ABS) showing the relative orientations of the waveguide, the NFT output end, the write pole tip and the reflection layer in the TAR head according to the invention.

FIG. 3B is a perspective view of the layers of material making up the write pole 52, the NFT 74, the waveguide 73 and the reflection layer 95. FIG. 3C is a view of a portion of the ABS showing the relative orientations of the waveguide end 73a, the NFT output end 80, the write pole tip 52a, the reflection layer end 95a and the return pole end 54a. The waveguide has a thickness $T_{wg}$ in the along-the-track direction and a width $W_{wg}$ in the cross-track direction, and the reflection layer 95 has a width $W_{rl}$ in the cross-track direction. The output end 80 has a generally triangular shape at the ABS with an apex 80a that faces the write pole tip 52a and a back edge 80b that faces the waveguide surface 73b and is wider than apex 80a in the cross-track direction (the Y axis). Thus the output end 80 has a back edge 80b at the ABS perpendicular to a polarization direction of incident light transmitted through the waveguide (arrow 24 in FIG. 3A) that gradually becomes smaller toward the apex 80a where an optical near-field is generated. The small lines 80c represent the optical spot generated at the output end apex 80a.

Figure 4A:
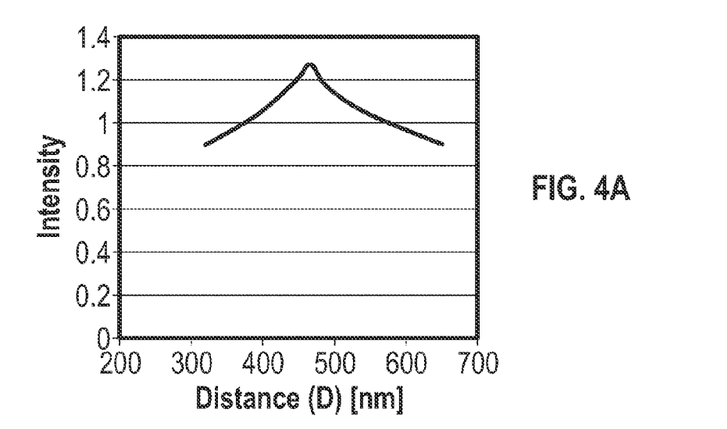
FIG. 4A is a graph of optical near-field intensity as a function of distance D between the reflection layer and the center of the thickness of the NFT in the along-the-track direction.

FIG. 4A shows the relation between the optical near-field intensity and the distance D. In this example the waveguide had a $Ta_2O_5$ core, a thickness $T_{wg}$ of 200 nm and a width $W_{wg}$ of 500 nm. The height $H_{rl}$ and width $W_{rl}$ of the reflection layer 95 were 500 nm and 1 µm respectively, and the wavelength $\lambda$ of the laser light was 830 nm. The height $H_{nft}$ of the NFT 74 layer was 850 nm. The intensity was normalized to the intensity when there was no reflection layer. As shown, the intensity reached the maximum when the distance D was 460 nm, and the intensity was larger than 1.0 when the distance was 460 nm+/−100 nm (corresponding to about +/−20%). The optimum value for D is given by $D=N*\lambda/(2n)$, where N is an integer (1, 2, 3, 4 . . . ), $\lambda$ is the wavelength of the laser light and n is the average of the indices of refraction of the waveguide 73 and the intermediate insulating material, typically alumina. Thus in this example, $\lambda=830$ nm, D=460 nm, N=2, and n was approximately 1.8. The optimum range for D is between $0.8N*\lambda/(2n)$ and $1.2N*\lambda/(2n)$. The optimum range for D when N=2 is between about $0.8\lambda/n$ and $1.2\lambda/n$.

Figure 4B:
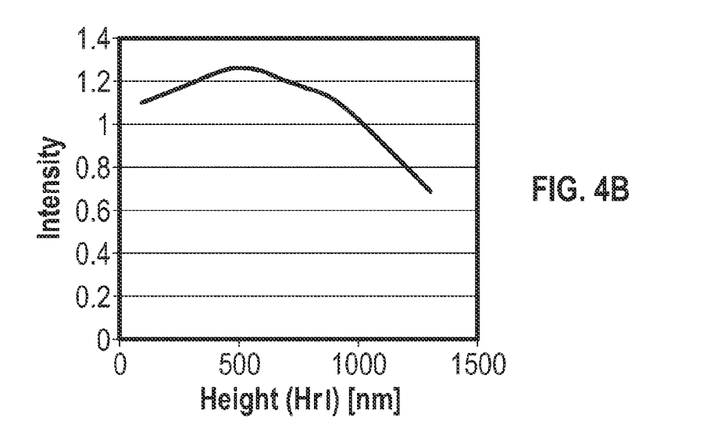
FIG. 4B is a graph of optical near-field intensity as a function of the height of the reflection layer ($H_{rl}$).

FIG. 4B shows the relation between the optical near-field intensity and the height of the reflection layer ($H_{rl}$). In this example the waveguide had a $Ta_2O_5$ core, a thickness $T_{wg}$ of 200 nm and a width $W_{wg}$ of 500 nm. The width $W_{rl}$ of the reflection layer 95 was 500 nm. The wavelength $\lambda$ of the laser light was 830 nm, the height $H_{nft}$ of the NFT layer 74 was 850 nm, and the distance D was 460 nm. The intensity was normalized to the intensity when there was no reflection layer. As shown, the intensity was higher than 1.0 when the height was smaller than 1 µm. Therefore it is preferable to let the height $H_{rl}$ be less than 1 µm. The optimum height $H_{rl}$ depends on the height $H_{nft}$ of the NFT. If $H_{rl}$ is too small with respect to $H_{nft}$, only a small fraction of the scattered light is reflected by the reflection layer, and the increase of the efficiency is small. It is preferable to have $H_{rl}$ be greater than 20% of the NFT height (0.2 $H_{nft}$). If $H_{rl}$ is too large, an evanescent wave generated near the waveguide core (light penetrating into the cladding) is scattered by the reflection layer before reaching the NFT. It is thus preferable to have $H_{rl}$ be smaller than 120% of the NFT height (1.2 $H_{nft}$).

Figure 4C:
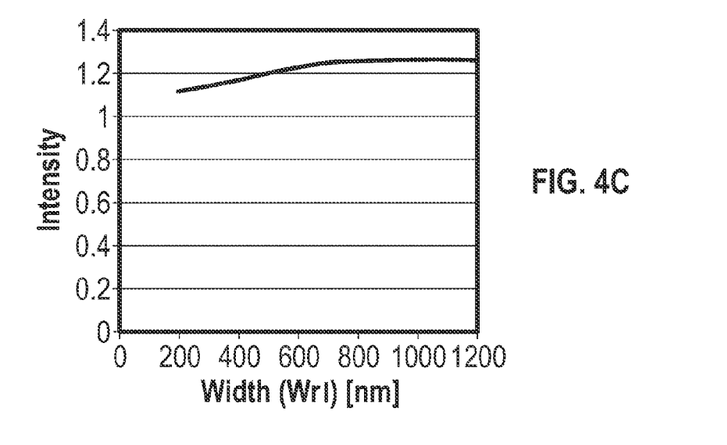
FIG. 4C is a graph of optical near-field intensity as a function of the width of the reflection layer ($W_{rl}$).

FIG. 4C shows the relation between the optical near-field intensity and the width of the reflection layer ($W_{rl}$). In this example the waveguide had a $Ta_2O_5$ core, a thickness $T_{wg}$ of 200 nm and a width $W_{wg}$ of 500 nm. The height $H_{rl}$ of the reflection layer 95 was 500 nm. The wavelength $\lambda$ of the laser light was 830 nm, the height $H_{nft}$ of the NFT layer 74 was 850 nm, and the distance D was 460 nm. The intensity was normalized to the intensity when there was no reflection layer. As shown, the near-field intensity gradually increases as the width $W_{rl}$ increases, and reaches a maximum at 700 nm. Thus it is preferable to have $W_{rl}$ be greater than 500 nm, which is the width $W_{wg}$ of the waveguide. The optical spot size in the waveguide (mode field diameter in the cross-track direction) is about 700 nm when the $W_{wg}$ is 500 nm. The size of the area where the scattered light is generated is almost equal to the mode field diameter of the waveguide. Therefore it is preferable to have the width of the reflection layer ($W_{rl}$) be greater than the mode field diameter of the waveguide, which is typically 1.4 $W_{wg}$. However, an intensity greater than 1.0 can still be achieved if $W_{rl}$ is as small as 100 nm, which is 20% of the width $W_{wg}$ in this example.

Figure 5A:
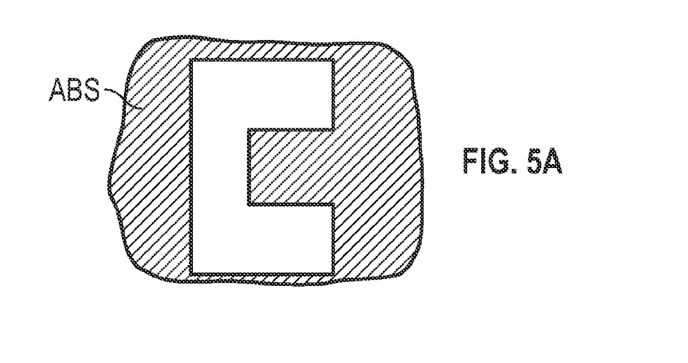
FIGS. 5A-5E illustrate other shapes, in particular a C-shaped aperture (FIG. 5A), a bowtie-shaped aperture (FIG. 5B), an E-shaped antenna (FIG. 5C), a bowtie-shaped antenna (FIG. 5D), and a "lollipop" shaped antenna (FIG. 5E) for use as NFT output ends in the TAR head according to the invention.
Figure 5B:
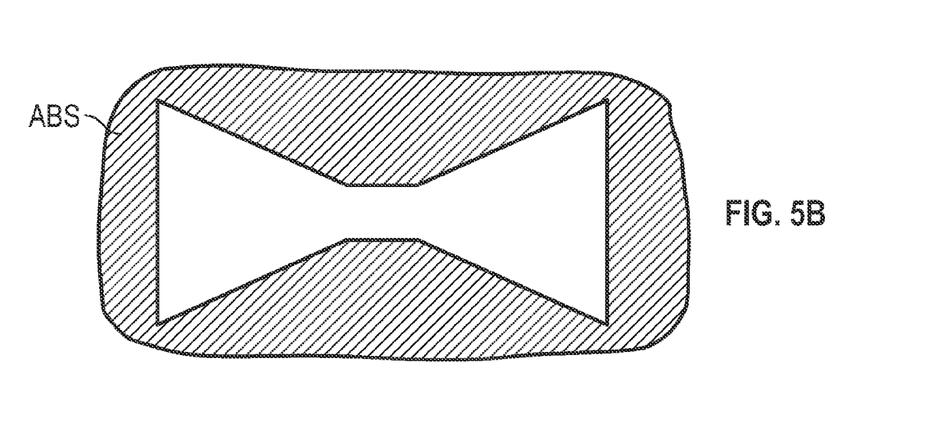
Figure 5C:
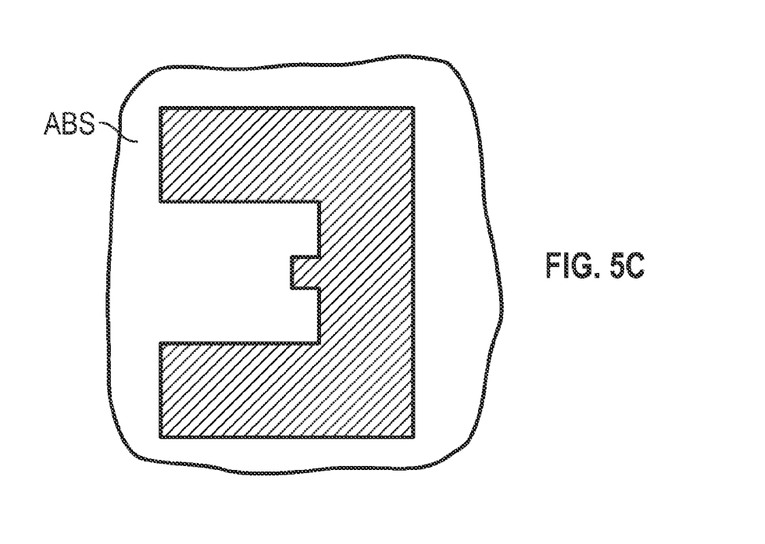
Figure 5D:
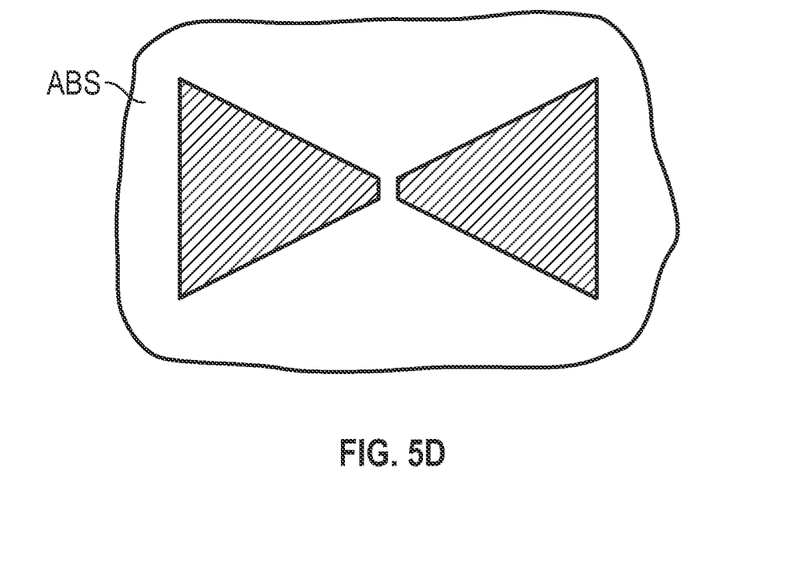
Figure 5E:
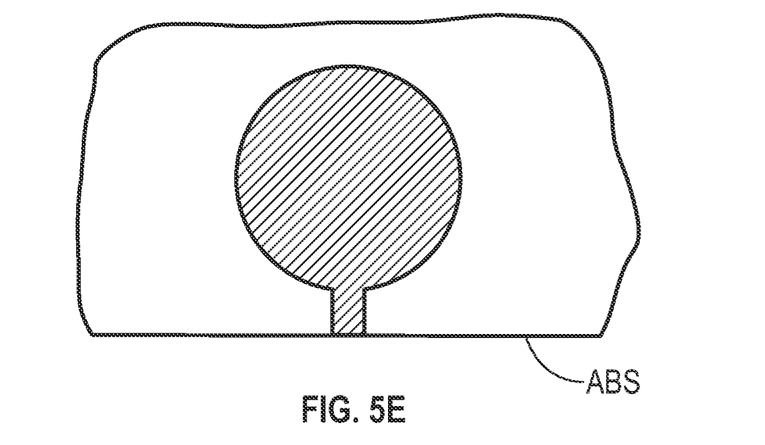

The invention has been described for a NFT output end having a generally triangularly-shaped antenna at the ABS. However, the reflection layer will provide the same benefits and advantages with other types of well known antenna and aperture shapes. FIGS. 5A-5C illustrate other shapes, in particular a C-shaped aperture (FIG. 5A), a bowtie-shaped aperture (FIG. 5B), an E-shaped antenna (FIG. 5C), a bowtie-shaped antenna (FIG. 5D), and a "lollipop" shaped antenna as shown in U.S. Pat. No. 7,272,079 B2 assigned to Seagate Technology (FIG. 5E).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A thermally-assisted recording (TAR) head for writing to a magnetic recording layer comprising:
   a head carrier having a recording-layer-facing surface;
   a write pole layer on the head carrier and having a tip at the recording-layer-facing surface;
   a near-field transducer (NFT) layer on the head carrier oriented generally parallel to the write pole layer, the NFT layer having an output end at the recording-layer-facing surface;
   an optical waveguide layer on the head carrier oriented generally parallel to the NFT layer for guiding laser light to the NFT layer, the NFT layer being located between the waveguide layer and the write pole layer;
   a reflection layer oriented generally parallel to the waveguide layer, the waveguide layer being located between the reflection layer and the NFT layer; and
   electrically insulating material between the waveguide layer and the reflection layer and between the waveguide layer and the NFT layer; and
   wherein the height of the NFT layer in a direction orthogonal to the recording-layer-facing surface is $H_{nft}$ and the height $H_{rl}$ of the reflection layer is between 0.2 $H_{nft}$ and 1.2 $H_{nft}$.

2. The TAR head of claim 1 wherein the distance D between the reflection layer and the NFT layer in a direction orthogonal to the waveguide layer is between $0.8N*\lambda/(2n)$ and $1.2N*\lambda/(2n)$, where N is an integer, $\lambda$ is the wavelength of the laser light and n is the average of the indices of refraction of the waveguide and said insulating material.

3. The TAR head of claim 1 wherein the waveguide layer has, in a plane parallel to the recording-layer-facing surface, a thickness $T_{wg}$ and a width $W_{wg}$ orthogonal to $T_{wg}$, and wherein the reflection layer has a width $W_{rl}$ parallel to $W_{wg}$ greater than 0.2 $W_{wg}$.

4. The TAR head of claim 3 wherein $W_{rl}$ is greater than 1.4 $W_{wg}$.

5. The TAR head of claim 1 further comprising a return pole layer oriented generally parallel to the reflection layer and wherein the reflection layer is supported on the return pole layer.

6. The TAR head of claim 1 wherein the reflection layer is formed of a metal or metal alloy comprising one or more of Cu, Ag, Au, Al, Rh, Ti, Cr, Mo, Fe, Co and Ni.

7. The TAR head of claim 1 wherein the NFT layer output end has a generally triangular shape, the output end having an apex facing the write pole layer.

8. The TAR head of claim 1 further comprising a magnetoresistive read head on the head carrier.

9. A thermally-assisted recording (TAR) head for writing to a magnetic recording layer on a magnetic recording disk comprising:
   an air-bearing slider having an air-bearing surface (ABS) for facing the magnetic recording layer on the disk, the ABS having an along-the-track axis and a cross-track axis orthogonal to the along-the-track axis;
   a write pole on the slider and having a tip at the ABS on the along-the-track axis;
   an optical waveguide on the slider having a thickness in the along-the-track axis direction and a surface oriented generally orthogonal to the along-the-track axis, the waveguide having a width $W_{wg}$ in the cross-track axis direction at an end near the ABS;
   a near-field transducer (NFT) on the slider between the write pole and the optical waveguide, the NFT having a surface parallel to and spaced from said waveguide surface, a thickness in the along-the-track axis direction and an output end at the ABS, the output end being located on the along-the-track axis between the write pole tip and the waveguide end;
   a reflection layer oriented generally parallel to said waveguide surface, the waveguide being located between the reflection layer and the NFT; and
   electrically insulating material between the waveguide and the reflection layer and between said waveguide surface and the NFT; and
   wherein the distance D between the reflection layer and the center of the thickness of the NFT in the along-the-track axis direction is between $0.8N*\lambda/(2n)$ and $1.2N*\lambda/(2n)$, where N is an integer, where $\lambda$ is the wavelength of the laser light and n is the average of the indices of refraction of the waveguide and said insulating material.

10. The TAR head of claim 9 wherein the height of the NFT layer in a direction orthogonal to the ABS is $H_{nft}$ and the height $H_{rl}$ of the reflection layer in a direction orthogonal to the ABS is between 0.2 $H_{nft}$ and 1.2 $H_{nft}$.

11. The TAR head of claim 9 wherein the reflection layer has a width $W_{rl}$ parallel to $W_{wg}$ greater than 0.2 $W_{wg}$.

12. The TAR head of claim 11 wherein $W_{rl}$ is greater than 1.4 $W_{wg}$.

13. The TAR head of claim 9 further comprising a return pole layer oriented generally parallel to the reflection layer and wherein the reflection layer is supported on the return pole layer.

14. The TAR head of claim 9 wherein the reflection layer is formed of a metal or metal alloy comprising one or more of Cu, Ag, Au, Al, Rh, Ti, Cr, Mo, Fe, Co and Ni.

15. The TAR head of claim 9 wherein the NFT output end has a generally triangular shape, the output end having an apex facing the write pole tip.

16. The TAR head of claim 9 wherein N=2.

17. A thermally-assisted recording (TAR) disk drive comprising:
   the TAR head of claim 9;
   a laser for directing light to the waveguide; and
   a magnetic recording disk having a magnetic recording layer.

18. The TAR disk drive of claim 17 wherein the magnetic recording layer is patterned into generally concentric tracks containing discrete islands of magnetic material.

19. A thermally-assisted recording (TAR) head for writing to a magnetic recording layer comprising:
   a head carrier having a recording-layer-facing surface;
   a write pole layer on the head carrier and having a tip at the recording-layer-facing surface;
   a near-field transducer (NFT) layer on the head carrier oriented generally parallel to the write pole layer, the NFT layer having an output end at the recording-layer-facing surface;
   an optical waveguide layer on the head carrier oriented generally parallel to the NFT layer for guiding laser light to the NFT layer, the NFT layer being located between the waveguide layer and the write pole layer;
   a reflection layer oriented generally parallel to the waveguide layer, the waveguide layer being located between the reflection layer and the NFT layer; and
   electrically insulating material between the waveguide layer and the reflection layer and between the waveguide layer and the NFT layer; and
   wherein the waveguide layer has, in a plane parallel to the recording-layer-facing surface, a thickness $T_{wg}$ and a width $W_{wg}$ orthogonal to $T_{wg}$, and wherein the reflection layer has a width $W_{rl}$ parallel to $W_{wg}$ greater than 0.2 $W_{wg}$.

20. The TAR head of claim 19 wherein $W_{rl}$ is greater than 1.4 $W_{wg}$.

21. A thermally-assisted recording (TAR) head for writing to a magnetic recording layer comprising:
   a head carrier having a recording-layer-facing surface;
   a write pole layer on the head carrier and having a tip at the recording-layer-facing surface;
   a near-field transducer (NFT) layer on the head carrier oriented generally parallel to the write pole layer, the NFT layer having an output end at the recording-layer-facing surface;
   an optical waveguide layer on the head carrier oriented generally parallel to the NFT layer for guiding laser light to the NFT layer, the NFT layer being located between the waveguide layer and the write pole layer;
   a reflection layer oriented generally parallel to the waveguide layer, the waveguide layer being located between the reflection layer and the NFT layer;
   a return pole layer oriented generally parallel to the reflection layer, the reflection layer being supported on the return pole layer; and
   electrically insulating material between the waveguide layer and the reflection layer and between the waveguide layer and the NFT layer.

* * * * *